US00RE35241E

United States Patent [19]

Capy et al.

[11] E Patent Number: Re. 35,241

[45] Reissued Date of Patent: May 14, 1996

[54] SANDWICH WRAPPER AND METHOD OF WRAPPING

[75] Inventors: Gilbert Capy, Denice; Jean-Luc Allain, Lyons; Jacques Benarrouch, Caluire, all of France

[73] Assignee: Wrapco International B.V., Rotterdam, Netherlands

[21] Appl. No.: 136,188

[22] Filed: Dec. 6, 1993

Related U.S. Patent Documents

Reissue of:

[64] Patent No.: 4,795,648
Issued: Jan. 3, 1989
Appl. No.: 026,125
Filed: Mar. 16, 1987

[30] Foreign Application Priority Data

Mar. 17, 1986 [FR] France ..... 86 03956

[51] Int. Cl.[6] ..... B65D 65/12

[52] U.S. Cl. ..... 426/111; 426/106; 426/115; 426/410; 229/87.03; 229/87.08; 229/938; 53/465; 383/20

[58] Field of Search ..... 229/87.03, 87.08, 229/DIG. 3, DIG. 4, DIG. 7, DIG. 13; 426/410, 106, 111, 115; 383/120; 206/410, 303; 53/465, 461, 466, 40; 493/394

[56] References Cited

U.S. PATENT DOCUMENTS

| | | | |
|---|---|---|---|
| 397,475 | 2/1889 | Tiffany | 206/459 |
| 834,474 | 10/1906 | Jackson . | |
| 1,165,644 | 12/1915 | Wood . | |
| 1,628,429 | 5/1927 | Radford | 229/87.05 |
| 1,846,584 | 2/1932 | Clark | 383/120 |
| 1,846,585 | 2/1932 | Clark | 383/120 |
| 1,846,949 | 2/1932 | Clark | 383/120 |
| 1,920,841 | 8/1933 | Clark | 229/87.03 |
| 1,948,615 | 2/1934 | Clark | 229/87.03 |
| 1,951,019 | 3/1934 | Hoffman et al. | 229/89 |
| 2,105,368 | 1/1938 | Parsons | 229/87.01 |
| 2,109,504 | 3/1938 | Ringler | 206/304 |
| 2,224,504 | 12/1940 | Milmoe | 229/87.01 |
| 2,586,078 | 2/1952 | O'Malley | 229/87.03 |
| 2,665,001 | 1/1954 | Corney | 206/304 |
| 2,705,104 | 3/1955 | Vogt | 229/87.03 |
| 2,845,215 | 7/1958 | Vogt | 229/87.03 |
| 3,120,337 | 2/1964 | Thomsen | 229/87.01 |
| 3,815,649 | 6/1974 | Delmar | 383/120 |
| 3,955,001 | 5/1976 | Kuepach et al. | 206/627 |
| 4,096,987 | 6/1978 | Rodish | 229/DIG. 3 |
| 4,137,333 | 1/1979 | Daswick | 426/123 |
| 4,494,785 | 1/1985 | Song | 294/25 |
| 4,795,648 | 1/1989 | Capy et al. | 426/410 |

FOREIGN PATENT DOCUMENTS

| | | | |
|---|---|---|---|
| 189654 | 12/1922 | United Kingdom | 229/87 F |

*Primary Examiner*—Steven Weinstein
*Attorney, Agent, or Firm*—Kane, Dalsimer, Sullivan, Kurucz, Levy, Eisele and Richard

[57] ABSTRACT

A sandwich wrapper is formed from a substantially rectangular sheet by providing a plurality of overlapping folds which are positioned into a substantially pleated arrangement. Two substantially parallel lines of adhesive, glue, or adhesive tape are used to attach spaced apart zones of the folded areas to each other. The dimensions of the sheet with respect to an article to be wrapped, spacing between the adhesive lines, and dimensions of the fold can be calculated to provide an efficient and cost-effective food wrapper.

23 Claims, 2 Drawing Sheets

SANDWICH WRAPPER AND METHOD OF WRAPPING

Matter enclosed in heavy brackets [ ] appears in the original patent but forms no part of this reissue specification; matter printed in italics indicates the additions made by reissue.

BACKGROUND OF THE INVENTION

1. Technical Field of the Invention

The present invention generally relates to the packaging of convex shaped articles, and more particularly to packaging for a variety of sandwiches, and specifically hamburger-type sandwiches.

2. Description of Background and Relevant Information

Presently, in France, a large number of fast food establishments have been developed. The development of these types of establishments has resulted in the replacement of conventional French and similar restaurants; these new restaurants direct their efforts to developing meals which include a round bun, cut at its center, parallel to its base, and filled with ground meat, which sandwiches are commonly known as hamburgers.

Conventional hamburger sandwiches comprise a plurality of successively piled layers of round ground beef patties, bread slices, sauce, tomato slices, and lettuce or other green vegetable slices, all of which are framed, both above and below, by two halves of a hamburger bun.

The hamburger sandwiches are prepared and are thereafter packaged, either in thin, resistant paper, or in an expanded polystyrene box. The paper wrapping is adapted to be used for small hamburger sandwiches, and is similar to the wrapping used on round pieces of cheese; it is generally more practical to remove the hamburger sandwich from its wrapping so that a consumer is able to eat it.

The expanded polystyrene box type of container is adapted to contain larger hamburger sandwiches, and it is imperative that the hamburger be removed from such box so that it can be eaten. One major disadvantage of a hamburger sandwich is that the meat, the vegetables, and the sauce which comprise the sandwich together form a mass which is substantial relative to the mass of the bread. As a result, the act of biting into the sandwich causes the garnish layers to slide with respect to each other, such that the hand of the user which holds the sandwich inevitably contacts the sauces and/or juices from the meat, all of which creates a tendency for these materials to drip and stain the ties and clothing if a consumer is not careful, particularly since they do not remain in the container when eaten.

SUMMARY OF THE INVENTION

Accordingly, it is a general object of the present invention to provide packages for hamburgers and similar sandwiches which are adapted to overcome the above-identified problems and to minimize the discomfort of a user which result from contact of undesirable juices and food with the clothing of a user.

In a first aspect of the present invention, a wrapper is adapted to be positioned about a solid article having a convex shape. The article has a central axis passing through the geometric center of the solid, wherein there are two intersecting planes which extend through the article, which include the axis. The wrapper comprises a thin, flexible substantially rectangular sheet having a predetermined width and a predetermined length, determined by particular equations, with respect to the dimensions of the object to be wrapped, set forth hereinafter, the sheet being folded into a plurality of folds which are substantially parallel to the width (substantially parallel to the length), wherein adjacent folds are positioned on top of each other and are adhesively attached to each other along two narrow strip areas located adjacent two side edges of the sheets.

The folds can be glued to each other, soldered to each other by a heat sensitive adhesive, or elsewhere attached to each other by adhesive tape attached to the sheet along the two strip areas.

The folds are positioned over each other in a lengthwise, staggered manner in a pleated fashion, with the folds comprising first and second sets of alternating width fold sections located along the sheet, wherein each of the fold sections in the first set of fold sections has a larger width than each of the fold sections in the second set of fold sections.

The dimension and number of folds as well as the length of the folded, i.e., plated wrapper, are also determined by particular equations set forth hereinafter, and are also dependent upon the dimensions of the article to be wrapped.

Narrow strips comprise substantially parallel selvage area, with the distance between selvage areas being equal to a value dependent upon the length of the wrapper and dimensions of the article to be wrapped, as set forth hereinafter.

The sheet can include, e.g., an additional strip between each of the selvage areas and a side edge of the sheet, with each additional strip having a width defined by the equation dependent upon the wrapper and the article to be wrapped, as set forth hereinafter. The additional strip can include a plurality of triangular recesses and triangular sections, wherein the width is measured to the peak of each of the sections, and the sheet can include a plurality of rounded corners.

Each of the folded areas are substantially equal, each folded area having a section of larger width and a section of a smaller width, the wrapper being adapted to cover a solid article in the form of a solid cylinder of revolution having a predetermined diameter and height, wherein the sheet width and length can be determined by particular equations with respect to the dimensions of the article to be wrapped, as will be set forth hereinafter.

Each of the strips has a width which is less than 5% of the sheet width, and the folds can be attached to each other by thermally-activated glue attached to the sheet prior to formation of the folds. Alternately, the folds can be attached to each other by heat and pressure when the folds are formed.

The sheet has a front surface and a rear surface, wherein the attachment strips can be located along both of the surfaces. The wrapper can be formed from a material which, when subjected to heat and pressure, will attach the folds to each other along both of the strips.

If desired, the folds can be attached to each other only along the strips.

The wrapper may comprise a thin paper sheet, wherein the folded areas are attached to each other by a plastic film along the strips, or the sheet can comprise a thin, flexible plastic film; the film can be a single film sheet, or a plurality of laminated sheets.

A plurality of the sheets can be provided in the form of a continuous roll of the material, the roll having a predetermined width, wherein the attachment strips are separated from each other by alternating distances, respectively. Each sheet includes a plurality of folds and a non-folded portion, the non-folded portion comprising means for facilitating separation of adjacent sheets from the roll.

In a second aspect, the present invention provides a method of wrapping a sandwich with a substantially rectangular wrapper having a predetermined length, a predetermined width, and a plurality of folded portions arranged substantially parallel to the width and overlapping each other in a pleated fashion, with the portions being adhered to each other along substantially folded parallel, spaced adhesive strips perpendicularly arranged with respect to the folded areas. The method comprises placing a first end of the wrapper into abutment with a peripheral portion of the sandwich, with the folded areas being substantially vertical, pulling an opposed second end of the wrapper about the sandwich, wherein the areas of the wrapper between the strips and side edges of the wrapper will form generally circular areas on the top and bottom of the sandwich as the pleats are unfolded, and attaching the first and second wrapper ends to each other.

In a third aspect of the present invention, a sandwich wrapper is formed from a thin, substantially rectangular sheet having opposed first and second ends and opposed first and second sides, the sheet comprising a plurality of overlapping folds arranged in a pleated fashion, the folds extending generally parallel to the edges and being separably attached to each other by substantially narrow adhesive areas arranged parallel to each other and to the sides, and perpendicularly with respect to the folds.

Each of the strips is spaced away from a respective one of the sides by an edge area of a predetermined distance.

Each of the folds comprises a first, relatively wide section of a first width and a, relatively narrow section of a second width, and all of the corners of the sheet can be rounded. Each of the edge areas can be provided to have a constant width.

A plurality of spaced triangular portions can be positioned adjacent the sheet sides, which portions will be adapted to overlap each other when the wrapper is wrapped about a food article.

The adhesive areas can extend along only a portion of the sheet sides. The wrapper is to be wrapped about a substantially cylindrical hamburger sandwich having a predetermined height and diameter, and the sheet has a predetermined width and a predetermined length, taking into account a sandwich-covering coefficient which will be set forth hereinafter. Each of the folds includes a relatively wide section and a relatively narrow section, defined by a predetermined relationship, and the length of the sheet, when folded, is also defined by a predetermined relationship, such relationships set forth hereinafter. The distance between the adhesive areas is likewise defined by a particular relationship also set forth hereinafter.

BRIEF DESCRIPTION OF THE DRAWINGS

The above and other objects, features, and advantages of the present invention will now be described more specifically with reference to the attached drawings, which are provided by way of non-limiting example only, wherein like reference numerals are used to identify similar parts throughout the several views, and wherein.

DESCRIPTION OF PREFERRED EMBODIMENTS

It is an object of the present invention to provide a sandwich wrapping which is adapted, on one hand, to be positioned about a hamburger sandwich in a relatively simple manner, and on the other hand, which is capable of protecting a hamburger sandwich during transport of the sandwich, and to protect, during consumption of the sandwich, a consumer against drips and stains which otherwise would result, i.e., it will serve as a receptacle during consumption. Thereafter, when a consumer has finished eating his hamburger, it is only necessary to crumple the wrapping paper into a ball and to throw it into the first garbage receptacle which is available.

Additionally, the wrapping can be mass-produced in large quantities in a continuous fashion; it is further advantageous that the present wrapper uses a smaller quantity of material than that used in conventional wrappers, and puts this lesser amount of material to better use. Finally, a wrapper in accordance with the present invention can be stored in a flat fashion so that it efficiently fills cartons and comprises an efficient load for pallets.

The combination of all of these advantages results in a product which has an extremely attractive performance-to-price ratio.

Figure 3:
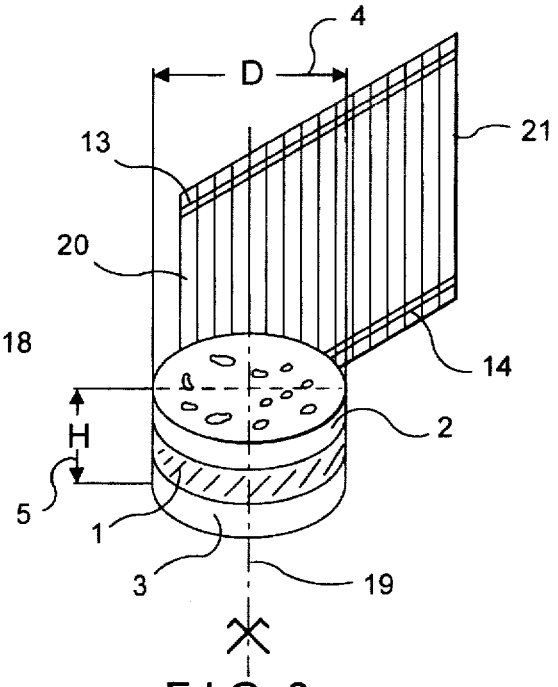
FIG. 3 is a perspective view of a first phase or stage of wrapping a hamburger sandwich with the folded wrapper of FIG. 2.

The present wrapping is adapted to wrap a hamburger sandwich, which sandwich is best illustrated in FIG. 3. The sandwich is substantially cylindrical and has a diameter D (or 4) and a height H (or 5), as best seen in FIG. 3.

The main parameters and characteristics of the wrapping will now be described. The wrapping preferably comprises a sheet of paper 6, as sheen in FIG. 1, which is thin and flexible, and which has a weight of approximately 20–30 $g/M_2$. The paper has good tear-resistance via its incorporation of relatively long fibers, and can possibly even be coated with polyethylene to increase this desirable resistance. It is also clear that the use of a relatively simple or complex plastic film is contemplated as being within the scope of the invention, rather than paper.

Figure 1:
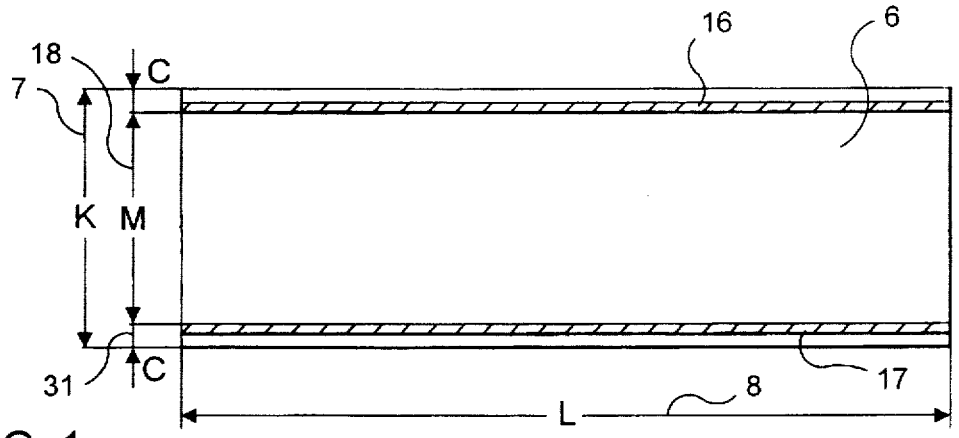
FIG. 1 is a plan view of a sheet formed in accordance with the present invention which comprises a wrapping prior to folding, including cross-hatching in zones 16 and 17, where adhesive is placed for attaching a plurality of folded areas to each other.

As seen in FIG. 1, the sheet is substantially rectangular and has a width 7 (or K), which width is selected in accordance with the equation K=D+H±5%. The length of the sheet is represented by L, where L is determined in accordance with the equation L=3.14D(1+alpha), where alpha is the optimum covering coefficient, which is between 0.2 and 0.6. In other words, the length of the wrapper L is calculated in accordance with the circumference of the hamburger (πD) multiplied by the number of times that the wrapper is to surround the hamburger (either partially or completely).

Figure 7:
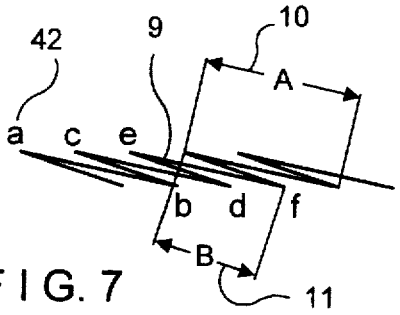
FIG. 7 is a sectional view illustrating the wrapper after it has been folded, illustrating the manner in which the folds of the folded sheet are positioned with respect to each other.
Figure 6:
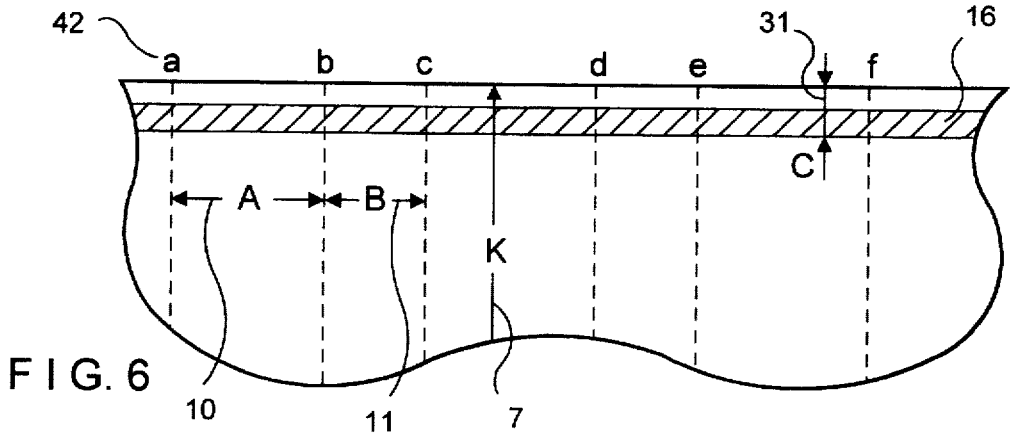
FIG. 6 is a detailed plan view of the sheet prior to being folded, illustrating, in dashed lines, the future locations of folds indicated by a set 42 of reference letters a–f.

The sheet is then provided with a plurality of accordion folds 9, as best seen in FIG. 7. The accordion folds are dissymetric and are positioned parallel to the width 7 of the sheet. Between the successive folded or pleated areas, as shown in FIGS. 6 and 7, alternating distances are provided; as shown in FIG. 7, a first set of distances 11, between fold lines in a relatively short series of folds on the paper is provided with each equal to the distance B in FIG. 6; and there is also a second set of distances 10 between some of the adjacent fold lines, which distances are each equivalent to A, which is the distance between the farther spaced apart fold lines on the wrapper in FIG. 6. As seen in the drawings, the distance B is less than the distance A. The value of the distance A is selected as a function of the hamburger sandwich to be wrapped, such that A is selected to be between D/4 and D/10. By so selecting the larger distance A, the wrapper will not have folding dimensions which are either too large or too small, which too large or too small dimensions would otherwise interfere with proper operation of the wrapper when it is used. The distances B, between the more closely spaced fold lines, is between ⅚ and ⅓ of the distance A.

Figure 2:
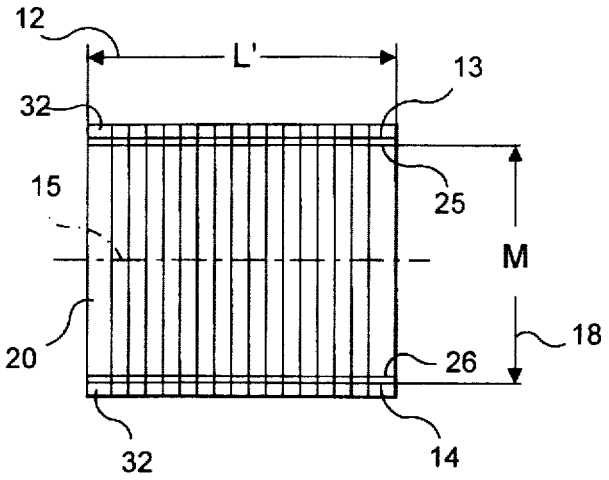
FIG. 2 is a plan view of the sheet of FIG. 1 after it has been folded and after which folded areas are attached to each other by bands 13 and 14.

Once folding has been performed, a rectangular folded wrapper is formed, as seen in FIG. 2, which still has the original width 7 with a value K as in the starting, unfolded sheet or wrapper of FIG. 1, and which also has a length with a value which has been substantially reduced. In essence, each completed fold comprises a portion of the folded wrapper which includes a strip of width A and a strip of width B. In this manner, the number of folds N which can be formed in the sheet is determined by the following equation: N=the largest whole number determined by the calculation L/(A+B), if all of the folds are formed of equal length. Obviously, there will be an additional amount of material which will remain and which will not form one of the folds N if the total length L of the unfolded wrapper is greater by some amount than a numerical factor multiplied by (A+B).

Figure 8:
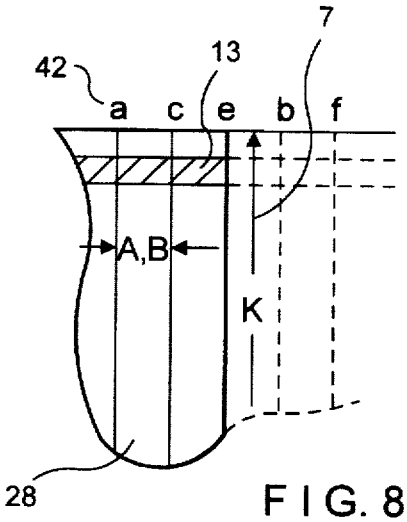
FIG. 8 is a top plan view of the wrapper of FIG. 6 after a plurality of folds have been formed.

The new length 12 of the folded wrapper is represented by the value L', which is determined by the following equation: L'=N(A−B)+B. As clearly seen in FIGS. 6, 7, and 8, the amount (A−B) corresponds to the path or extent 28 of each fold. In practice, the distance L' will be slightly larger than as calculated by the above formula because, in order to facilitate cutting between two wrappers, a small zone having no folds is left between each set of N folds. The folded areas are then attached to each other along two narrow, substantially parallel strips 13 and 14, as seen in FIG. 2, which strips are positioned symmetrically along both sides of the axis of symmetry 15 of the wrapper which is located perpendicular to the folds, again as seen in FIG. 2.

Gluing of the folds can be achieved in various fashions.

It is possible to coat the wrapping paper prior to folding with strips 16 and 17 (see FIG. 1) of a product which will adhere to the wrapper surface under contact and pressure, under either hot or cold temperatures. For example, a cold adhesive can be used which will attach/adhere the folds to each other as soon as the folds are folded back on each other and pressure is applied to them.

After folding, it is possible to glue the folds, via hot pressing, by using a thermally activatable strip which has been previously positioned on the wrapping paper. From experience, it is preferable to deposit a strip of such glue on each side of the unfolded wrapper or sheet 6 so that the folds will be glued to each other along both sides of the fold.

It is also possible to deposit a strip of adhesive film, after folding, to hold the folds together. As in the above embodiments, better grip and adhesion between the folds will be obtained if the adhesive is placed on both sides of the wrapper.

For proper operation of the wrapper, the width of each attachment band 13 or 14 which attaches the folds to each other must be less than 5% of the width K of the wrapper. In this fashion, a zone 18 having a width M is formed between the inner boundaries or selvage areas of each of the attachment strips 13 and 14, as best shown in FIG. 1. This zone is located between the attachment strips and is free to be unfolded when the wrapper is eventually wrapped about a hamburger sandwich. The wrapper thus obtained is used in a fashion as described hereinafter, as first illustrated with reference to FIG. 3.

Figure 4:
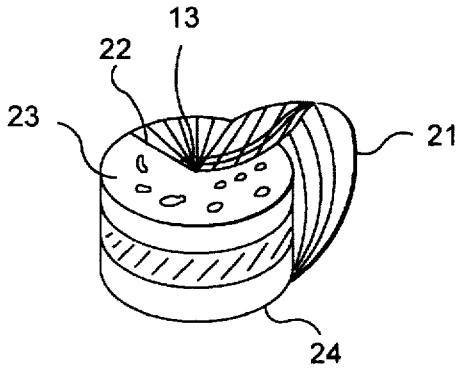
FIG. 4 is a perspective view of a subsequent stage of folding the wrapper of FIG. 2 about a hamburger sandwich.
Figure 5:
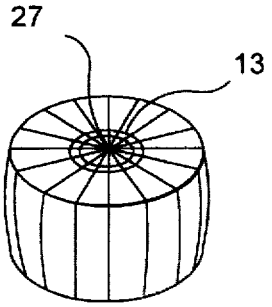
FIG. 5 is a perspective view of a final stage in which the wrapper of FIGS. 2–4 has been wrapped about a hamburger sandwich.

In use, first end portion 20 of the wrapper is applied on or positioned in abutment with a cylindrical peripheral portion of the hamburger sandwich such that the folds will be located parallel to axis 19 of the cylindrical sandwich. The median portion 15 of the wrapper, which is located perpendicular to each of the folds, is located substantially in the middle of the height H (or 5) of the cylindrical sandwich. The hamburger is preferably held between the thumb and the middle finger of the left hand of a consumer so that the index finger of the consumer will be free to retain end portion 20 of the wrapper against the hamburger. The free or second end portion 21 of the wrapper, adjacent median portion 15 of the wrapper, is then grabbed and the consumer pulls (as seen in FIG. 4) the wrapper in a fashion so as to undo the folds in a "rolling" fashion. When the wrapper is so unfolded, edge portions 22 naturally tend to move together, folding over the upper and lower circular surfaces 23 and 24 of the sandwich. The upper strip 13, which serves to attach the folds together, thus defines a circle 27 (see FIG. 5), the position of which depends upon the distance between attachment strip 13 and attachment strip 14.

For the wrapper to be unfolded properly, the distance 18, represented by M, which represents the width between the internal selvage portions 25 and 26 of attachment strips 13 and 14 (see FIG. 2) is preferably of a particular dimension which is calculated as follows:

$$M=(2B\times D)/(A+B)+H\pm 5\%$$

It has been observed that if M is too small a value, it will be difficult to unfold the folds from the pleated wrapper, and if M is too large, the wrapper will form a conical area over the circular surfaces of the hamburger sandwich, which conical area is difficult to flatten out.

Figure 9:
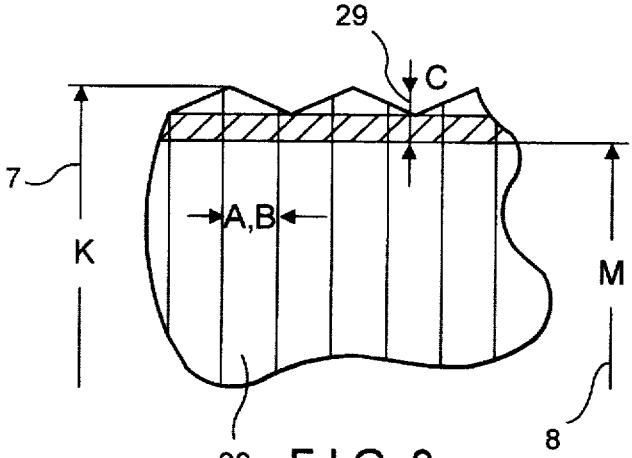
FIG. 9 is a cutaway plan view of a second embodiment of a wrapper formed in accordance with the present invention, in which a plurality of recessed or cutaway zones 31, each having a predetermined width C, are provided, which wrapper is adapted to reduce the amount of wrinkles on the wrapping paper within a circle 27 when the wrapper is positioned about a food article to be protected.

All that portion of the paper wrapped situated along both sides of the interior selvage of the attachment strips is positioned so as to form a circle 27 defined by the selvage 25. If left unattended, folding of this section will have wrinkles which can, however, be attenuated by providing a plurality of cutouts 29 (see FIG. 9) in a manner so as to eliminate excess paper. These cutouts are formed in one embodiment, in a triangular configuration. Additionally, better coverage of the sandwich can be provided by rounding the wrapper corners 32.

Figure 10:
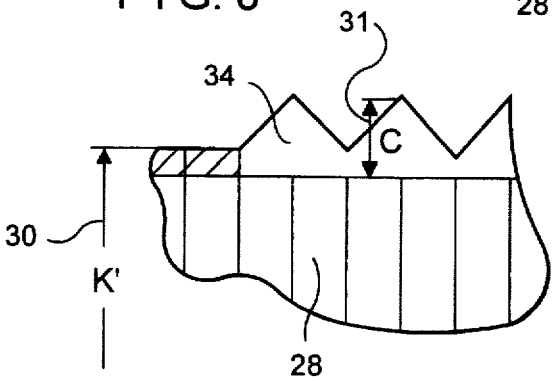
FIG. 10 is a partial or cutaway plan view of a wrapper having a cutout or recessed area adjacent to a strip of adhesive film.

In an alternate embodiment of the invention, a wrapper is provided which begins with a sheet having a width K', or 30 as seen in FIG. 10. Width K' is defined here as being equal to the value M, increased by the width of each of the attachment strips along the folded areas. Thereafter, the sheet is folded as in the first embodiment, and a non-folded strip portion 34 having a width 31 defined by C=½ (D+H−M), which is used to attach the folds and which is located rightwardly of the attachment strip, comprises a plurality of triangular cutouts. The triangular cutouts make it possible, during positioning of the wrapper around a hamburger, to fill a circle 27 defined by the internal selvages 25 and 26 of the attachment strips, with the triangular portions 34 overlapping one another in a scale-like or roof-tile fashion.

It has further been found that, if B is selected to be less than or equal to A/2, the embodiment of FIG. 10 is an appropriate solution for wrapping a hamburger. However, if B is greater than A/2 but less than 2A/3, it is preferable to form the triangular cutouts during the folding process. Finally, if B is greater than or equal to 2A/3 and less than or equal to 5A/6, it is possible to use the wrapper without forming triangular cutouts during folding; in this case, adhesive ribbons are preferably not utilized to attach the folds, because the contact surfaces between the adhesive ribbon and the triangular cutouts would provide an adhesive contact area which would become unduly weak.

The manufacture of the wrapper is effected from a roll of paper or thin plastic film having a substantial width. In one example, thermally activatable glue strips are continuously positioned along the roll of thin plastic film or paper in the direction of movement of the sheet from the roll; these strips will alternately be spaced from each other by distances M and K−M, respectively. Folding is effect in a perpendicular fashion with respect to the direction of movement of the sheet. The cutting of strips of width K occurs just prior to folding, and gluing of the folds occurs during hot pressing which occurs after folding. Finally, the machine provides a non-folded strip along every N folds, and it is in the zone of the non-folded portion of the wrapper that the wrapper is cut, thereby defining a folded wrapper having a length L'.

Figure 11:
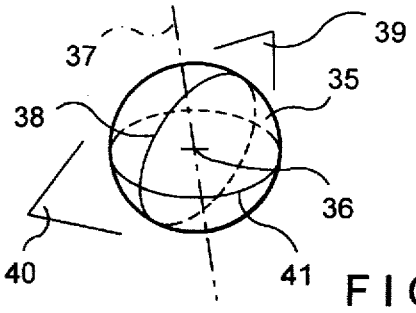
FIG. 11 is a perspective view of a substantially convex object which is adapted to be covered by a wrapper in accordance with another embodiment of the present invention.

The above embodiments have been directed to a wrapper which is adapted to assume a cylindrical shape when it is wrapped about a cylindrical article. The same wrapper can, however, be perfectly adapted to any convex configuration 35, as shown in FIG. 11; specifically, it is adapted to conform to the shape of any convex article between a cylindrical and a spherical shape, including, e.g., ovoidal and ellipsoidal configurations. The characteristics of such a wrapper are defined with respect to the direction at which first end 20 of the wrapper is positioned. An axis 37 is defined, as shown in FIG. 11, which will be parallel to the folds of the wrapper and which will pass through the isobar center (when used herein, isobar center refers to the geometric center of a solid article) 36 of the shaped article. The surface of the convexly shaped article will intersect with a plane 39 which passes through axis 37; this intersection will form a closed curve 38 having a length P. A plane 40 passes through the isobar center 36 perpendicular to axis 37, cutting the surface of the convexly shaped article 35 along a closed curve 41 having a length R.

With these parameters, the dimensions of the wrapper are preferably calculated in accordance with the following formulae:

K=P/2±5%; L=R(1+alpha), where 0.2<alpha<0.6, R/31.4<A<R/12.6, and A/3<B<5A/6; where N=(the whole number portion of L/(A+B)), with L'=N(A−B)+B; M=P/2−L'/3.14(1+alpha)± 5%, and where C=P/4−M/2.

Finally, it is possible in any of these wrappers to have fold interruptions or folds of variable dimensions. Under these conditions, assuming that the folds are identified by a series 1,2, . . . , i . . . , N, where each fold "i" is characterized by Ai and Bi, the formulas noted directly above become:

$$R/31.4<Ai<R/12.6$$

and $$Ai/3<Bi<5Ai/6.$$

where Ai and Bi will assume random values within their respective ranges of variation.

In this case, N is defined such that $$N = L - \sum_{1}^{N} (Ai + Bi) \geqq 0 > L - \sum_{1}^{N+1} (Ai + Bi)$$

Under these conditions an approach value of L' can be defined which is sufficiently precise such that the determination of other parameters, i.e., M and C, can be calculated in accordance with the formulas described above, i.e., L' is defined by $$L' = \sum_{1}^{N} (Ai - Bi)$$

The present application has proposed securing the folds by means of a thermally activatable glue, which has previously been disposed or positioned along the wrapping sheet. Instead, a component on the sheet itself could be used to attach the folds to each other by hot pressing the folds between two thermal electrodes, or other equivalent systems could be used to form strips 13 or 14 of desired widths. This technique can be used whenever the structure comprises, along its exterior surface, a plastic film such as polyethylene, and under such conditions, the folds will be heat-soldered.

Although the present invention has been described with respect to specific means, materials, and embodiments, it is to be understood that the invention is not limited to the particular embodiments disclosed, and extends to all equivalents which are within the scope of the claims hereinafter.

What is claimed is:

[1. A wrapper adapted to be positioned about and wrap a solid article having a convex shape, said article having a central axis passing through the geometric center of said solid, wherein two intersecting planes extend through said article and include said axis, wherein said wrapper comprises a thin, flexible substantially rectangular sheet having a predetermined width and a predetermined length, said sheet comprising two lengthwise-extending opposing side edges and first and second opposing ends, said sheet further being folded into a plurality of folds which extend substantially parallel to said width, wherein adjacent folds are positioned on top of and overlap each other in a lengthwise, staggered manner and are adhesively attached to each other along two lengthwise-extending narrow strip areas located, respectively, proximate said two side edges of said sheet, said wrapper, including said strip areas, being dimensioned and configured relative to said article such that upon holding one of said ends of said wrapper against said article and pulling the opposite one of said ends of said wrapper about the periphery of said article, said plurality of folds between said strip areas at least partially unfold to allow said wrapper to encompass the periphery of said article, whereas portions of said wrapper adjacent said strip areas and said side edges tend to move together, respectively, to cause said portions to fold over and under said article to substantially enclose said article.]

2. A wrapper in accordance with claim [1] *37*, wherein said folds are glued to each other.

3. A wrapper in accordance with claim [1] *37*, wherein said folds are soldered to each other by a heat sensitive adhesive.

4. A wrapper in accordance with claim [1] *37*, wherein said folds are attached to each other by adhesive tape attached to the sheet along said two strip areas.

[5. A wrapper in accordance with claim 1 wherein said folds are positioned over each other in a pleated fashion, said folds comprising first and second sets of alternating width sections located along said sheet, wherein each of the fold sections in the first set of fold sections has a larger width than each of the fold sections in the second set of fold sections, thus producing a staggered array.]

[6. A wrapper in accordance with claim 5, wherein said narrow strip areas comprise substantially parallel selvage areas, with the distance (M) between said selvage areas being equal to M=P/2−L/3.14(1+alpha)±5%, wherein P is defined as the length of the closed curve formed by the intersection of a first one of said planes and one arcuate surface of said article, and wherein M is the distance between the strip areas and wherein said sheet length (L) is defined by the equation L=R(1+alpha), wherein 0.2<alpha<0.6, wherein R is defined as the length of a closed curve formed by the intersection of a second of said planes and a second arcuate surface of said article, said second plane substantially perpendicular to said first plane, and wherein there are a plurality (N) of folds (i), with each fold section in the first set having a width Ai, and each fold section in the second set having a width Bi, wherein R/31.4<Ai<R/12.6,Ai/3<Bi<5Ai/6, with the total number of folds (i) on said sheet being N, wherein $$[L = \sum_{1}^{N} (Ai + Bi) \geqq 0 > L - \sum_{1}^{N+1} (Ai + Bi)]$$

with the length of said sheet, when unfolded, being L, and its length when folded being defined by $$[L' = \sum_{1}^{N} (Ai + Bi)]$$

]

7. A wrapper in accordance with claim [6] *37*, wherein said sheet width (K) is defined by the equation K=P/2±5% and, further, *wherein said narrow strip areas comprise selvage areas,* wherein said sheet includes an additional strip between each of said selvage areas and a side edge of said sheet, each additional strip having a width (C) defined by the equation C=P/4−M/2.

8. A wrapper in accordance with claim 7, wherein said additional strip includes a plurality of triangular recesses and triangular sections, wherein said width (C) is measured to the peak of each of said sections.

9. A wrapper in accordance with claim 8, wherein said sheet includes a plurality of rounded corners.

10. A wrapper in accordance with claim [1] *37*, wherein each of the [folded areas] *folds* are substantially equal, [each folded area comprising a larger section of width A and a smaller section of width B,] said wrapper being adapted to cover an article in the form of a solid cylinder of revolution having a diameter D and a height H, wherein the sheet width K=D+H±5%, the sheet length L=3.14D(1+alpha), [wherein 0.2<alpha<0.6,] wherein D/10<A<D/4, [A/3<B<5A/6, M=2B×D/A+B+H±5%] *M=2B×D/CA+B)+H±5%* , and C=½(D+H−M), where [M is the distance between said two strips, and] C is the width of a portion of said sheet between a side edge of said sheet and one of said [strips] *narrow strip areas*.

11. A wrapper in accordance with claim [1] *37* wherein each of said [strips] *strip areas* has a width which is less than 5% of the sheet width [K] (*K*).

12. A wrapper in accordance with claim [1] *37* wherein said folds are attached to each other by thermally-activated glue attached to said sheet prior to formation of said folds.

13. A wrapper in accordance with claim 12 wherein said folds are attached to each other by heat and pressure when the folds are formed.

14. A wrapper in accordance with claim [1] *37*, wherein said sheet has a front surface and a rear surface, and wherein said [strips] *strip areas* are located along both of said surfaces.

15. A wrapper in accordance with claim [1] *37*, wherein said wrapper is formed from a material which, when subjected to heat and pressure, will attach the folds to each other along both of said [strips] *strip areas*.

16. A wrapper in accordance with claim 15, wherein said folds are attached to each other only along said [strips] *strip areas*.

17. A wrapper in accordance with claim [1] *37* which comprises a thin paper sheet, wherein said [folded areas] *folds* are attached to each other by a plastic film along said [strips] *strip areas*.

18. A wrapper in accordance with claim [1] *37* wherein said sheet comprises a thin, flexible plastic film.

19. A wrapper in accordance with claim 18 comprising a single film sheet.

20. A wrapper in accordance with claim 18 comprising a plurality of laminated sheets.

21. A wrapper in accordance with claim [1] *37* comprising a plurality of sheets on a continuous roll of said material.

22. A wrapper in accordance with claim 21, wherein each sheet includes a plurality of folds and a non-folded portion, said non-folded portion comprising means for facilitating separation of adjacent sheets from said roll.

[23. A method of wrapping an article having a predetermined shape with a substantially rectangular wrapper having a predetermined shape with a substantially rectangular wrapper having a predetermined length, a predetermined width, opposing end portions and opposing side edges, and a plurality of folded portions arranged substantially parallel to said width and overlapping each other in a lengthwise staggered, pleated fashion, said folded portions being adhered to each other along substantially parallel, spaced longitudinal adhesive strip areas substantially perpendicularly arranged with respect to said folded areas, said method comprising:

(a) placing one of said end portions of said wrapper into abutment with a peripheral portion of said article, with said wrapper being substantially flat;

(b) pulling the opposite one of said ends of said wrapper about the periphery of said article such that said plurality of folds between said strip areas at least partially unfold to allow said wrapper to encompass the periphery of said article, whereas portions of said wrapper adjacent said strip areas and said side edges tend to move together, respectively, to cause said portions to fold over and under said article to substantially enclose said article.]

24. The method of wrapping an article in accordance with claim [23] *38*, wherein said article is a food product and said method is a method of wrapping said food product.

25. The method of wrapping an article in accordance with claim [24] *38*, wherein said food product is a sandwich and said method is a method of wrapping said sandwich.

[26. A sandwich wrapper formed from a thin, substantially rectangular sheet having opposed first and second ends defining a length between them and opposed first and second sides, said sheet comprising a plurality of lengthwise staggered, overlapping folds arranged in pleated fashion, said folds extending generally parallel to said ends and being attached to each other by substantially narrow adhesive strip areas arranged substantially parallel to each other and to said first and second sides and substantially perpendicularly with respect to said folds, said wrapper, including said strip areas, being dimensioned and configured relative to said sandwich such that upon holding one of said ends of said wrapper against said sandwich and pulling the opposite one of said ends of said wrapper about the periphery of said sandwich, said plurality of folds between said strip areas at least partially unfold to allow said wrapper to encompass the periphery of said sandwich, whereas portions of said wrapper adjacent said strip areas and said side edge tend to move together, respectively, to cause said portions to fold over and under said sandwich to substantially enclose said sandwich.]

[27. A wrapper in accordance with claim 26, wherein each of said strip areas is spaced from a respective one of said sides by an edge area of a predetermined distance.]

[28. A wrapper in accordance with claim 27 wherein each of said folds comprises a first, relatively wide section of width A and a second, relatively narrow section of width B.]

[29. A wrapper in accordance with claim 27 wherein all of the corners of said sheet are rounded.]

[30. A wrapper in accordance with claim 27 wherein each of said edge areas has a constant width.]

[31. A wrapper in accordance with claim 30, wherein said strip areas extend along only a portion of said sheet sides.]

[32. A wrapper in accordance with claim 27, wherein said wrapper is wrapped about a substantially cylindrical hamburger sandwich having a height H and a diameter D.]

[33. A wrapper in accordance with claim 32 wherein said sheet has a width K=D+H±5% and a length L=3.14(1+alpha), where alpha is an optimum sandwich covering coefficient between 0.2 and 0.6.]

[34. A wrapper in accordance with claim 32 wherein each of said folds comprises a wide section of width A and a relatively narrow section of width B, wherein D4>A>D/10, ⅝A>B>A/3, and the length of the sheet, when folded, is defined by L'=N(A−B), where N is the number of folds in the sheet.]

[35. A wrapper in accordance with claim 32 wherein the distance between the adhesive areas is defined by M=2B×D/A+B+H±5%.]

[36. A wrapper in accordance with claim 26 further comprising a plurality of spaced triangular portions adjacent said sheet sides which are adapted to overlap each other when said wrapper is wrapped about a food article.]

*37. A wrapper adapted to be positioned about and wrap a solid article having a convex shape, said article having a central axis passing through the geometric center of said solid, wherein two intersecting planes extend through said article and include said axis, wherein said wrapper comprises a thin, flexible substantially rectangular sheet having a predetermined sheet width (K) and a predetermined sheet length (L), said sheet comprising two lengthwise-extending opposing side edges and first and second opposing ends, said sheet further being folded into a plurality of folds which extend substantially parallel to said width, wherein adjacent folds are positioned on top of and overlap each other in a lengthwise, staggered manner and are adhesively attached to each other along two lengthwise-extending narrow strip areas separated by a distance M located, respectively, proximate said two side edges of said sheet to form a pleated wrapper, said wrapper, including said strip areas, being dimensioned and configured relative to said article such that upon holding one of said ends of said wrapper against said article and pulling the opposite one of said ends of said wrapper about the periphery of said article, said plurality of folds between said strip areas at least partially unfold to allow said wrapper to encompass the periphery of said article, whereas portions of said wrapper adjacent said strip areas and said side edges tend to move together, respectively, to cause said portions to fold over and under said article to substantially enclose said article wherein each fold comprises a larger section of width A and a smaller section of width B connected to and folded relative to the larger section;*

*wherein A, B and M are defined by*

*(R/31.4<A<(R/12.6),*

*(A/3<B<(5A/6), and*

*M=(P/2)−L'/3.14* (1+alpha)+/−5%;*

*wherein P is a length of a closed curve formed by the intersection of a first of said planes and a first arcuate surface of said article; R is a length of a closed curve formed by the intersection of a second of said planes and a second arcuate surface of said article, said second plane being substantially perpendicular to said first plane; L' is the length of the pleated wrapper; and alpha has a value between* 0.2 and 0.6.

*38. A method of wrapping an article having a predetermined shape with a substantially rectangular wrapper said article having a geometric center and central axis passing through said geometric center with two intersecting planes extending through said article and including said central axis, said wrapper having a predetermined length, a predetermined width, opposing end portions and opposing side edges, and a plurality of folded portions arranged substantially parallel to said width and overlapping each other in a lengthwise staggered, pleated fashion, said folded portions being adhered to each other along substantially parallel spaced longitudinal adhesive strip areas substantially perpendicularly arranged with respect to said folded areas and separated by a distance M, wherein each fold comprises a larger section of width A and a smaller section of width B connected to and folded relative to the larger section;*

*wherein A, B and M are defined by*

*(R/31.4)<A<(R/2.6), and*

*(A/3)<B<(5A/6), and*

*M=(P/2)−L'/3.14* (1+alpha)+/−5%;*

*wherein P is a length of a closed curve formed by the intersection of a first of said planes and a first arcuate surface of said article; R is a length of a closed curve formed by the intersection of a second of said planes and a second arcuate surface of said article, said second plane being substantially perpendicular to said first plane; L' is the length of the pleated wrapper; and alpha has a value between 0.2 and 0.6*

*(a) placing one said end portions of said wrapper into abutment with a peripheral portion of said article, with said wrapper being substantially flat;*

*(b) pulling the opposite one of said ends of said wrapper about the periphery of said article such that said plurality of folds between said strip areas at least partially unfold to allow said wrapper to encompass the periphery of said article, whereas portions of said wrapper adjacent said strip areas and said side edges tend to move together, respectively, to cause said portions to fold over and under said article to substantially enclose said article.*

* * * * *